April 18, 1939. A. H. J. DE L. SAINT GENIES 2,154,868
SCREEN FOR THE PROJECTION OF IMAGES IN RELIEF
Filed Sept. 19, 1936. 2 Sheets-Sheet 1
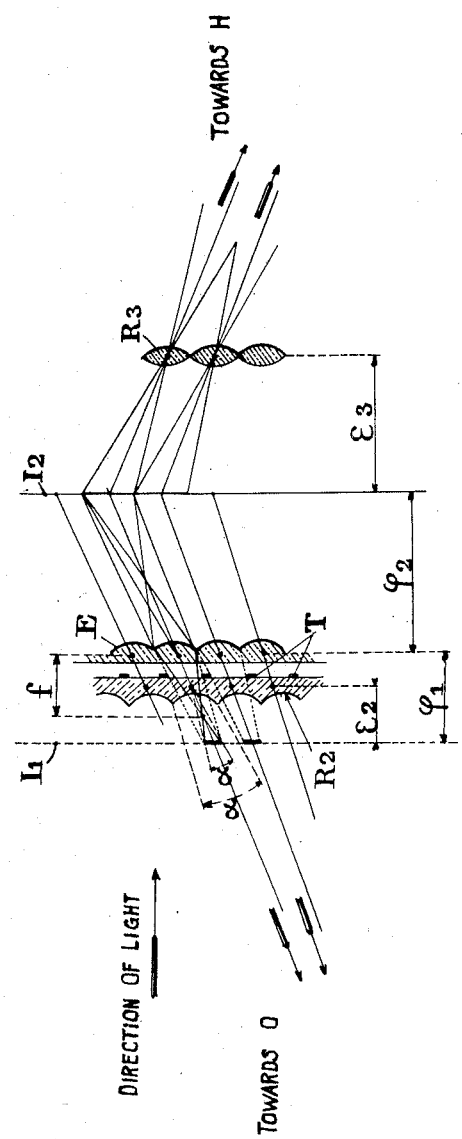
INVENTOR.
Annie Henri Jacques
de Lassus Saint Genies.
By Stone, Boyden & Mack
ATTORNEYS.

April 18, 1939. A. H. J. DE L. SAINT GENIES 2,154,868
SCREEN FOR THE PROJECTION OF IMAGES IN RELIEF
Filed Sept. 19, 1936 2 Sheets-Sheet 2
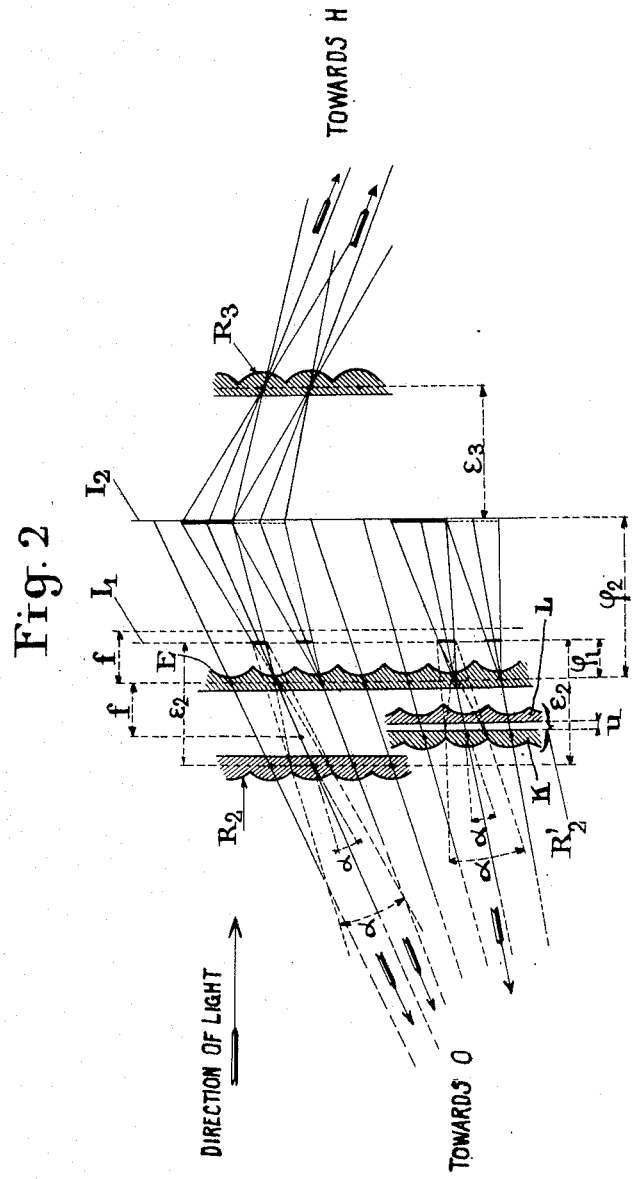

Patented Apr. 18, 1939

2,154,868

UNITED STATES PATENT OFFICE 2,154,868

SCREEN FOR THE PROJECTION OF IMAGES IN RELIEF

Anne Henri Jacques de Lassus Saint Genies, Versailles, France

Application September 19, 1936, Serial No. 101,654
In France September 24, 1935

7 Claims. (Cl. 88—24)

It has already been proposed to project either real three-dimensional objects or lenticular or lined photographs on which images in relief have been recorded or copied, onto complex screens formed by associated refractive systems and permitting the direct observation of the relief.

Such a screen may be formed, for instance, by an unpolished surface on which there is formed a large number of real partial images, distinct and, at the limit, in contact, corresponding to different points of view. These images are observed through a lenticular network in the same manner as the image on the lenticular photograph, recorded on the plate which is projected, is observed.

To form these adjacent images on the unpolished surface, it has been proposed to employ a first refractive system comprising lenticular elements which form in their common focal plane, images of the emergent pupil of the projecting objective, and to collect again these images by means of a second system of the same kind which projects them one by one, on the desired scale, onto the unpolished plane. Each of these systems may be formed by one or more refractive networks of suitable focal lengths arranged in such a manner that their elements correspond to one another.

A third refractive system, situated on the other side of the unpolished surface, allows of observing these images, as indicated above.

Such screens form the subject of my patent application Serial No. 12,511; if they comprise, between the projecting objective and the unpolished surface, convergent optical networks, this introduces certain practical limitations into their construction and application.

According to the present invention, the use of divergent networks constituting one or the other of the refractive systems arranged between the projecting objective and the unpolished surface offers advantages such as, in particular, a reduction of the total thickness and an increase in the luminosity of the screen, as will be shown in the following.

Figure 1 is a schematic section of the screen in one form of embodiment, and Figure 2 is a similar section of a second form of embodiment.

Fig. 1 illustrates, in section through a plane containing the principal optical axis of the projecting apparatus, a screen in accordance with the invention. The luminous beams proceeding from the projecting objective O (not shown) impinge on the first network $R_2$, composed of divergent optical elements. E is the second network, which is convergent, $I_1$ is the focal plane of the network $R_2$, $I_2$ is the conjugate unpolished plane of $I_1$ with respect to the optical elements of the network E, and $R_3$ is the last network arranged on the side of the observers placed in the zone of observation denoted by the letter H. Each of the three networks $R_2$, E and $R_3$ may be simple or complex.

The screen shown in Fig. 1 functions in the following manner. Each element of the first divergent network $R_2$ gives a small virtual image, in the plane $I_1$, of the emergent pupil of the objective O, viewed at the angle $\alpha$; these images, which are situated in the image plane of $R_2$ at the distance $\epsilon_2$, are not necessarily in contact, as the figure shows. The convergent network E is formed in such a manner that its optical elements correspond one by one to the elements of $R_2$, the straight lines joining one by one their respective optical centres meeting at the centre of the emergent pupil of O.

This network E collects again element by element the above elementary images, to give real and enlarged images thereof in the unpolished surface $I_2$. The focal length $f$ of the optical elements of E is such that the distances $\varphi_1$ and $\varphi_2$ of the planes $I_1$ and $I_2$ are conjugate in the system E. The images formed in the surface $I_2$ may be, at the limit, in contact, but should never overlap one another. The assembly of the system $R_2E$ produces on $I_2$ rotated images of the emergent pupil of O.

The network $R_3$ presents optical elements, the pitch of which is a little more restricted than the pitch of the images constructed on $I_2$, so as to offer at a suitable finite distance a zone of observation H, on both sides of which are found points for observation of the image in relief which is formed by the assembly of the elementary images of $I_2$. Each of these images is partly viewed through a corresponding optical element of the network $R_3$.

It is known that, under these conditions, if a lenticular photograph on which there has been recorded an image in reversed or pseudoscopic relief is projected, the image viewed by the observers placed on the side of H offers the correct relief.

In the example under consideration, it has been assumed that the optical elements of $R_2$ were plano-concave and those of E plano-convex; their assembly forms a convergent system. It is understood that, according to the value of the refractive index and the radii of curvature adopted for the spherical or cylindrical faces of the elements of $R_2$ and of E, the interval which exists between these two networks may be very small and even zero at the limit. Everything depends on the enlargement required from the network E for passing from the images constructed at $I_1$ to those constructed at $I_2$. As the distance between the two networks diminishes, their pitches gradually tend to become equal, as well as their opacities. In all cases, the spacing being relatively small, this arrangement allows of reducing the total thickness of the screen.

In practice, however, the network $R_2$ will preferably have to present a certain opacity, while that of E, as that of $R_3$, is preferably zero. This opacity of the network $R_2$ may be simply obtained either, for instance, with the aid of partitions between the optical elements of the first network or of the first two networks, or, for instance, by adding to one of the faces of the first network, for instance the plane face for facility, a grid or web T, the opaque parts of which will be of a size such that none of the luminous beams traversing each optical element of $R_2$ runs the risk, after refraction through this network, of impinging on the network E outside of the optical element which corresponds to it homothetically. Therefore, the nearer $R_2$ is to E, the more approximate may the opacity of $R_2$ be to zero.

In Fig. 2, a screen is illustrated in which it is the second optical network E that is formed by divergent elements; the assembly of the first and second networks remains convergent. This arrangement, which inverts that of Fig. 1, leads likewise, however, to the provision of screens onto which, to perceive the correct relief, subjects offering the pseudoscopic relief must be projected; in effect, as in Fig. 1, the reversal by 180° of the images of the emergence pupil of the projecting objective O is effected here only once by that of the two networks which comprises the convergent optical elements.

In this figure, $R_2$ is the first network consisting of convergent optical elements, E is the second network included between $R_2$ and the unpolished surface $I_2$, this network being composed of divergent elements. $I_1$ is the focal plane of the first network; it is the conjugate of $I_2$ relatively to the optical elements of the network E. The network $R_3$ situated on the side of the observers is, as in Fig. 1, convergent.

To show an example of complex networks, a modification of $R_2$ is shown at $R'_2$. This network is preferably composed of two refractive systems; the first K is convergent and the second L is divergent; and air-gap $u$ separates them if necessary, and the assembly $R'_2$ remains convergent.

This particular arrangement, suggested by the teleobjective, has the function, on one hand, of bringing the network $R'_2$ nearer to the plane $I_1$, in order to reduce the thickness of the screen. On the other hand, it allows of giving to each of the optical elements of the network $R'_2$ sufficiently short focal lengths, which facilitates their formation. The focal length resulting from their assembly offers the value $\epsilon_2$, which is greater than each of the focal lengths of its component elements.

Under these conditions, $\epsilon_2$ is the focal length of $R_2$ or of $R'_2$; $f$ is the focal length of E; $\varphi_1$ and $\varphi_2$ are the conjugate distances of $I$ and $I_2$ relatively to E; $\epsilon_3$ is the focal length of $R_3$.

The functioning of the screen of Fig. 2 is similar to that of Fig. 1, with substantially the following differences: on one hand, it is not necessary to arrange an opaque grid T between the networks $R_2$ and E or $R'_2$ and E; on the other hand, the network $R_2$, if it were alone, would construct in the plane $I_1$ real images of the emergent pupil of the objective O; these images behave as virtual objects with respect to the optical elements of the network E. The planes $I_1$ and $I_2$ remain conjugate in the network E of focal length $f$; the real images on $I_2$ are enlarged as before.

In this modification the grid T is rendered unnecessary by the fact that the beams impinging on $R_2$ at the aperture $\alpha$ can never overlap the corresponding elements of E after refraction through elements of $R_2$.

I claim:

1. A transparent screen system for use in association with an optical projecting device for producing a picture in relief of a three-dimensional primary subject or a photograph recorded on a lenticular film, which system comprises an unpolished translucent surface, a lenticular system, arranged on the side of said unpolished surface facing the projecting device, the said lenticular system comprising in cooperating relationship convergent and divergent networks, each consisting of a large number of small lenses, for forming on said unpolished surface real, substantially contiguous images of the exit pupil of the projecting objective, and a lenticular network consisting of a large number of small convergent lenses of short focal length arranged at the focal distance of its lenses on the side of said unpolished surface facing the observers.

2. A transparent screen system for use in association with an optical projecting device for producing a picture in relief of a three-dimensional primary subject or a photograph recorded on a lenticular film, which system comprises an unpolished translucent surface, a lenticular system arranged on the side of said unpolished surface facing the projecting device, and a lenticular network consisting of a large number of small convergent lenses of short focal length arranged at the focal distance of its lenses on the side of the unpolished surface facing the observers, said lenticular system comprising a first network consisting of a large number of small divergent lenses for forming small separated virtual images of the exit pupil of the projecting objective, and a second network arranged between said first network and said unpolished surface, said second network consisting of a large number of small convergent lenses, for projecting real enlarged images of said small virtual images onto said unpolished surface.

3. A transparent screen system for use in association with an optical projecting device for producing a picture in relief of a three-dimensional primary subject or a photograph recorded on a lenticular film, which system comprises an unpolished translucent surface, a lenticular system arranged on the side of said unpolished surface facing the projecting device, and a lenticular network consisting of a large number of small convergent lenses of short focal length arranged at the focal distance of its lenses on the side of the unpolished surface facing the observers, said lenticular system comprising a first network consisting of a large number of small convergent lenses for forming small separated images of the exit pupil of the projecting objective, and a second network arranged between said first network and said unpolished surface, said network consisting of a large number of small divergent lenses, for projecting real enlarged images of said small images onto said unpolished surface.

4. A transparent screen system for use in association with an optical projecting device for producing a picture in relief of a three-dimensional primary subject or a photograph recorded on a lenticular film which system comprises an unpolished translucent surface, a lenticular system arranged on the side of said unpolished surface facing the projecting device, and a lenticular network consisting of a large number of small convergent lenses of short focal length arranged at the focal distance of its lenses on the side of the unpolished surface facing the observers, said lenticular system comprising a first network consisting of a large number of small divergent lenses for forming small virtual images of the exit pupil of the projecting objective, a second network arranged between said first network and said unpolished surface, said network consisting of a large number of small convergent lenses for projecting real enlarged images of said small virtual images onto said unpolished surface, and opaque delimiting means between said two networks to prevent the overlapping of the luminous beams emanating from the lenses of the network of divergent lenses on the lenses of the network of convergent lenses.

5. Transparent screen system for use in association with an optical projecting device for producing a picture in relief of a three-dimensional primary subject or a photograph in relief recorded on a lenticular film, which system comprises at least three lenticular networks formed of a large number of small lenses of short focal lengths and one unpolished translucent surface, one of said lenticular networks being arranged between the observers and the unpolished surface, and two of said lenticular networks being arranged between said unpolished surface and the projecting device, said two lenticular networks comprising a network of convergent lenses and a network of divergent lenses, the said networks being so located that the focal plane of the network nearest the projecting device is the conjugate of the unpolished surface with respect to the network nearest the unpolished surface, the lenses of one of said two lenticular networks corresponding one by one to those of the other of said networks, the pitch of the lenses of the network adjacent the unpolished surface being greater than the pitch of the network facing the projecting device so that the axes of the elementary beams emanating from the said projecting device pass through the centres of the corresponding lenses of both networks, the said two networks cooperating to produce on the unpolished surface elementary real contiguous images of the exit pupil of the projecting objective, the network on the side of the unpolished surface facing the observers being arranged at a distance from the said unpolished surface equal to the focal length of its lenses, the lenses of said last-mentioned network corresponding one by one to the images produced on the unpolished surface, the pitch of the lenses of said network being less than the pitch of said images whereby said network collimates said images to the observers.

6. Transparent screen system for use in association with an optical projecting device for producing a picture in relief of a three-dimensional primary subject or a photograph in relief recorded on a lenticular film, which system comprises an unpolished translucent surface, a first lenticular network consisting of a large number of small divergent lenses arranged between said unpolished surface and the projecting device, a second lenticular network consisting of a large number of small convergent lenses of short focal length arranged between said first network and said unpolished surface, the said networks being so located that the focal plane of the first network is the conjugate of the unpolished surface with respect to the second network, the lenses of one of said two lenticular networks corresponding one by one to those of the other of said networks, the pitch of the lenses of the second network being greater than the pitch of the lenses of the first network so that the axes of the elementary beams emanating from the projecting device pass through the centres of the corresponding lenses of the two networks, the said two networks cooperating to produce on the unpolished surface elementary real contiguous images of the exit pupil of the projecting objective, and a third network on the side of the unpolished surface facing the observers, said third network being arranged at a distance from the said unpolished surface equal to the focal length of its lenses, the lenses of said third network corresponding one by one to the images produced on the unpolished surface, the pitch of the lenses of said third network being less than the pitch of said images whereby said third network collimates said images to the observers.

7. Transparent screen system for use in association with an optical projecting device for producing a picture in relief of a three-dimensional primary subject or a photograph in relief recorded on a lenticular film, which system comprises an unpolished translucent surface, a first lenticular network consisting of a large number of small convergent lenses of short focal length arranged between said unpolished surface and the projecting device, a second lenticular network consisting of a large number of small divergent lenses of short focal length arranged between said first network and said unpolished surface, the said networks being so located that the focal plane of the first network is the conjugate of the unpolished surface with respect to the second network, the lenses of one of said two lenticular networks corresponding one by one to those of the other of said networks, the pitch of the lenses of the second network being greater than the pitch of the lenses of the first network so that the axes of the elementary beams emanating from the projecting device pass through the centres of the corresponding lenses of the two networks, the said two networks cooperating to produce on the unpolished surface elementary real contiguous images of the exit pupil of the projecting objective, and a third network on the side of the unpolished surface facing the observers, said third network being arranged at a distance from the said unpolished surface equal to the focal length of its lenses, the lenses of said third network corresponding one by one to the images produced on the unpolished surface, the pitch of the lenses of said third network being less than the pitch of said images whereby said third network collimates said images to the observers.

ANNE HENRI JACQUES DE
LASSUS ST. GENIES.